(12) United States Patent  (10) Patent No.: US 7,850,195 B2
Simard et al.  (45) Date of Patent: Dec. 14, 2010

(54) TANDEM SUSPENSION FOR STEERABLE AXLES

(75) Inventors: Andre-Marie Simard, Baie St-Paul (CA); Maxime Pilote, Baie St-Paul (CA); Michel Bosse, Baie St-Paul (CA); Patrice Gaudreault, Baie St-Paul (CA)

(73) Assignee: Simard Suspensions Inc., Baie-St-Paul, Quebec (CA)

( * ) Notice: Subject to any disclaimer, the term of this patent is extended or adjusted under 35 U.S.C. 154(b) by 307 days.

(21) Appl. No.: 11/697,142

(22) Filed: Apr. 5, 2007

(65) Prior Publication Data

US 2007/0273072 A1 Nov. 29, 2007

Related U.S. Application Data

(60) Provisional application No. 60/808,158, filed on May 25, 2006.

(51) Int. Cl.
*B60G 17/04* (2006.01)

(52) U.S. Cl. ............. 280/678; 280/5.514; 280/124.163; 280/683

(58) Field of Classification Search .................. 29/428; 267/32, 52, 227; 280/124.17, 124.174–124.176, 280/124.162, 124.163, 676–678, 680, 682, 280/683, 686; 180/24.02
See application file for complete search history.

(56) References Cited

U.S. PATENT DOCUMENTS

| | | | |
|---|---|---|---|
| 2,771,303 A * | 11/1956 | Frazier | 280/682 |
| 3,063,732 A | 11/1962 | Harbers et al. | |
| 3,201,141 A * | 8/1965 | Bernstein et al. | 280/683 |
| 3,233,915 A | 2/1966 | Hamlet | |
| 3,285,621 A | 11/1966 | Turner, Jr. | |
| 3,762,487 A | 10/1973 | Bilas | |
| 3,902,734 A | 9/1975 | Fier | |
| 4,256,326 A * | 3/1981 | Cantrell et al. | 280/683 |
| 4,619,467 A | 10/1986 | Lafferty | |
| 4,676,523 A | 6/1987 | Rogers | |
| 4,783,089 A * | 11/1988 | Hamilton et al. | 280/6.157 |
| 4,854,409 A * | 8/1989 | Hillebrand et al. | 180/24.02 |
| 4,966,387 A | 10/1990 | White | |
| 4,993,729 A * | 2/1991 | Payne | 280/81.1 |
| 5,271,638 A | 12/1993 | Yale | |

(Continued)

FOREIGN PATENT DOCUMENTS

CA 2070859 1/1995

*Primary Examiner*—Ruth Ilan
*Assistant Examiner*—James English
(74) *Attorney, Agent, or Firm*—Fogg & Powers LLC

(57) ABSTRACT

A tandem suspension for connecting a vehicle chassis to front and rear steerable axles is provided. The tandem suspension includes, on each side of the vehicle, a front leaf spring linking the chassis and the front axle, a rear leaf spring linking the chassis and the rear axle, an equalizer assembly mounted to the chassis for equalizing the front and rear axles, a front air spring disposed between the chassis and the front axle, a rear air spring disposed between the chassis and the rear axle, and a pneumatic control system pneumatically linked to the front and rear air springs for supplying pressurised gas thereto and operable to unload one of the front and rear air springs. A method of installing a tandem suspension in a vehicle having a first steerable axle and a front leaf spring is also provided.

20 Claims, 2 Drawing Sheets

U.S. PATENT DOCUMENTS

| | | | |
|---|---|---|---|
| 5,273,308 A * | 12/1993 | Griffiths | 280/6.151 |
| 5,354,091 A | 10/1994 | Baxter et al. | |
| 5,615,906 A | 4/1997 | Raidel, Sr. | |
| 5,873,581 A | 2/1999 | Yale | |
| 6,224,074 B1 | 5/2001 | Cadden | |
| 6,276,710 B1 | 8/2001 | Sutton | |
| 6,364,340 B1 | 4/2002 | Taylor | |
| 6,382,659 B1 * | 5/2002 | Simard | 280/686 |
| 6,394,474 B1 * | 5/2002 | Warinner et al. | 280/124.104 |
| 6,398,236 B1 * | 6/2002 | Richardson | 280/86.5 |
| 6,412,789 B1 * | 7/2002 | Pierce et al. | 280/6.151 |
| 6,460,872 B2 | 10/2002 | Cadden | |
| 6,604,756 B2 * | 8/2003 | Simard et al. | 280/676 |
| 6,832,143 B2 * | 12/2004 | Trudeau et al. | 701/37 |
| 6,857,647 B2 | 2/2005 | Johnsman et al. | |
| 6,997,464 B2 * | 2/2006 | Yakimishyn | 280/6.159 |
| 7,066,474 B2 * | 6/2006 | Hiebert et al. | 280/6.153 |
| 7,077,411 B2 * | 7/2006 | Peters et al. | 280/124.132 |
| 7,222,867 B2 * | 5/2007 | Rotz et al. | 280/86.5 |
| 7,249,780 B1 * | 7/2007 | Wilson | 280/676 |
| 7,677,339 B2 * | 3/2010 | Oscarsson | 180/24.02 |
| 2004/0080136 A1 | 4/2004 | Johnsman et al. | |
| 2005/0263986 A1 | 12/2005 | Miller et al. | |
| 2006/0208464 A1 | 9/2006 | Raidel, II et al. | |
| 2007/0013160 A1 * | 1/2007 | Richardson | 280/124.116 |

* cited by examiner

TANDEM SUSPENSION FOR STEERABLE AXLES

FIELD OF THE INVENTION

The present invention relates to a vehicle suspension. More particularly, and in its preferred intended use, the present invention relates to a tandem suspension for a truck. The present invention also relates to a method of installing such a suspension.

BACKGROUND OF THE INVENTION

Suspensions for trucks and the like are very well known in the art.

Indeed, a conventional vehicle suspension for connecting an axle to the structural frame, or chassis, includes a combination of springs and shock absorbers for absorbing, isolating and dampening the movements transmitted between the axle and the chassis. Typically, a vehicle such as a truck will include a front axle supporting a pair of front wheels and at least one rear axle supporting a pair of rear wheels. A second (rear tandem) and even third (rear tridem) rear axle can be provided to increase the load capacity of a given truck.

It is also known in the art to provide a second front axle to further increase the load capacity of a truck. Such a front suspension is called a front tandem suspension.

Canadian Patent No. 2,070,859, issued Jan. 10, 1995 to Simard and titled "Tandem Axle Suspension for Vehicle", describes a front suspension for a truck or semi-trailer including front and rear tandem axles connected to a vehicle chassis by first and second leaf springs, respectively. In order to distribute the load evenly between the front and rear axles, an equalizer beam is provided rockably mounted onto the chassis and connected at one end to the rear extremity of the first leaf spring, and at the other end to the front extremity of the second leaf spring.

It is also known to use air springs in conjunction with, or in place of, conventional springs in order to improve ride comfort.

U.S. Pat. No. 6,382,659, issued May 7, 2002 to Simard and titled "Load Distributing Tandem Suspension Assembly", describes a tandem front suspension similar to that described above, with the addition of an air spring and shock absorber for supporting the second front axle in conjunction with the second leaf spring.

A drawback associated with tandem suspensions is that they decrease the traction of each wheel. While a tandem suspension allows a truck to bear more weight by providing an additional front axle with which to further support the truck's load, this increased capacity comes with a price. As the load is spread between the various axles, and wheels, so is the traction. This is especially apparent and detrimental when the truck is unloaded and what little weight remains is distributed between the plurality of axles and wheels. As a result, single front axle trucks must often be used for servicing sites which require off-road travel as tandem axle trucks cannot generate enough traction to navigate off-road when unloaded.

Known in the art are the following U.S. patents which disclose prior-art suspensions.

U.S. Pat. No. 3,285,621, issued Nov. 15, 1966 to Turner, describes a vehicle suspension having a first axle mounted to a chassis by a conventional leaf spring and a second axle mounted to the chassis by both a leaf spring and air spring. A pneumatic system inflates the air spring, but can also deflate the air spring in order to raise the second axle and lift its wheels off the road surface.

U.S. Pat. No. 3,762,487, issued Oct. 2, 1973 to Bilas, describes a tandem vehicle suspension comprising first and second axles. Connecting the axles to the vehicle's chassis are a pair of air springs and a shared leaf spring. The air springs are aligned with respective axles, while the shared leaf spring is mounted to the chassis at its midpoint and engages the axles at its extremities. The air springs are connected to a pneumatic system which is operable to deflate one of the air springs in order to raise an axle and lift its wheels off the road surface.

U.S. Pat. No. 6,364,340, issued Apr. 2, 2002 to Taylor, describes a similar tandem vehicle suspension comprising a pair of axles mounted at either end of a shared leaf spring. An air spring is provided between the chassis and one of the axles and is operable to be inflated such that the opposing axle and wheels are raised from the road surface.

A drawback of these tandem suspensions is that in enabling the unloading of one of the tandem axles, the ride comfort and quality can be significantly diminished. This is especially true when the tandem are steerable axles, i.e. axles that are supporting steerable wheels rather than fixed wheels, in contrast with the patents of Turner, Bilas and Taylor which primarily provide tandem suspensions for non-steered axles.

In view of the above, there remains a need for a tandem suspension which provides increased ride comfort for a user and overcomes the aforementioned limitations of the prior art while exploiting the advantages of a tandem air spring suspension. There further remains a need for a suspension which combines the increased load capacity of a front tandem axle suspension without the aforementioned loss of traction.

Also known in the art are the following patents and published applications which also describe tandem suspensions and the like: U.S. Pat. Nos. 3,063,732, 3,233,915, 3,902,734, 4,619,467, 4,676,523, 4,966,387, 5,271,638, 5,354,091, 5,615,906, 5,873,581, 6,224,074, 6,276,710, 6,460,872, 6,857,647, US2004/0080136, US2005/0263986, and US 2006/0208464.

SUMMARY OF THE INVENTION

An object of the present invention is to provide a tandem suspension which, by virtue of its design and components, satisfies some of the above-mentioned needs and is thus an improvement over other related devices and/or suspension systems known in the prior art.

In accordance with the present invention, the above object is achieved, as will be easily understood, with a tandem suspension such as the one briefly described herein and such as the one exemplified in the accompanying drawings.

More particularly, a tandem suspension is provided for connecting a chassis of a vehicle to front and rear axles, wherein the front and rear axles are steerable. The tandem suspension includes, on each side of the vehicle, a front leaf spring linking the chassis and the front axle, a rear leaf spring linking the chassis and the rear axle, an equalizer assembly mounted to the chassis for equalizing the front and rear axles, a front air spring disposed between the chassis and the front axle, a rear air spring disposed between the chassis and the rear axle, and a pneumatic control system pneumatically linked to the front and rear air springs for supplying pressurised gas thereto and operable to unload one of the front and rear air springs. The front leaf spring has first and second extremities and the front axle is mounted therebetween, while the first extremity of the front leaf spring engages the chassis. The rear leaf spring has first and second extremities and the rear axle is mounted therebetween, while the first extremity of the rear leaf spring engages the chassis. The equalizer assembly links the respective second extremities of the front and rear leaf springs.

According to another aspect of the present invention there is also provided a method of installing a tandem suspension in a vehicle having a first steerable axle and a front leaf spring linking the chassis and the front axle. The front leaf spring has first and second extremities and the first extremity engages the chassis. The method includes steps of: providing a second steerable axle for positioning behind the first axle in a tandem configuration therewith; linking the chassis and the second axle with a second leaf spring, installing an equalizer assembly for equalizing the front and rear axles, installing a first air spring between the chassis and the first axle, installing a second air spring between the chassis and the second axle, and installing a pneumatic control system operable to be pneumatically linked to the first and second air springs for supplying pressurised gas thereto and operable to unload one of the front and rear air springs. The second leaf spring has first and second extremities, the first extremity engages the chassis, and the second axle is mounted between the first and second extremities. The equalizer assembly is operable to be mounted to the chassis and to link the respective second extremities of the front and rear leaf springs.

As can be appreciated, a tandem suspension according to the present invention can advantageously improve the absorption, isolation and dampening axle movement during driving, which has been found especially difficult in tandem suspensions comprising steerable axles. Such improved suspension performance is beneficial not only to the driver and cargo, but to the long-term life of the vehicle.

The invention and its advantages will be better understood by reading the following non-restrictive description of a preferred embodiment thereof, made with reference to the accompanying drawings.

DETAILED DESCRIPTION OF PREFERRED EMBODIMENTS OF THE INVENTION

In the following description, the same numerical references refer to similar elements. The embodiments shown in the figures are preferred, for exemplification purposes only.

In the context of the present description, the expression "truck" includes all types of vehicles, automotive or otherwise, suitable for transporting goods, as apparent to a person skilled in the art. However, it will be appreciated that application of the present invention is not limited to trucks. Rather, application of the present invention on any vehicle with a tandem axle arrangement is within the scope of the invention.

In addition, although the preferred embodiments of the present invention as illustrated in the accompanying drawings includes various components, etc., and although the preferred embodiments of the suspension and corresponding parts of the present invention as shown consist of certain geometrical configurations as explained and illustrated herein, not all of these components and geometries are essential to the invention and thus should not be taken in their restrictive sense, i.e. these components and geometries should not be taken as to limit the scope of the present invention. It is to be understood, as also apparent to a person skilled in the art, that other suitable components and cooperations therebetween, as well as other suitable geometrical configurations may be used for the suspension according to the present invention, as will be briefly explained herein and as can be easily inferred herefrom by a person skilled in the art, without departing from the scope of the invention.

Figure 1:
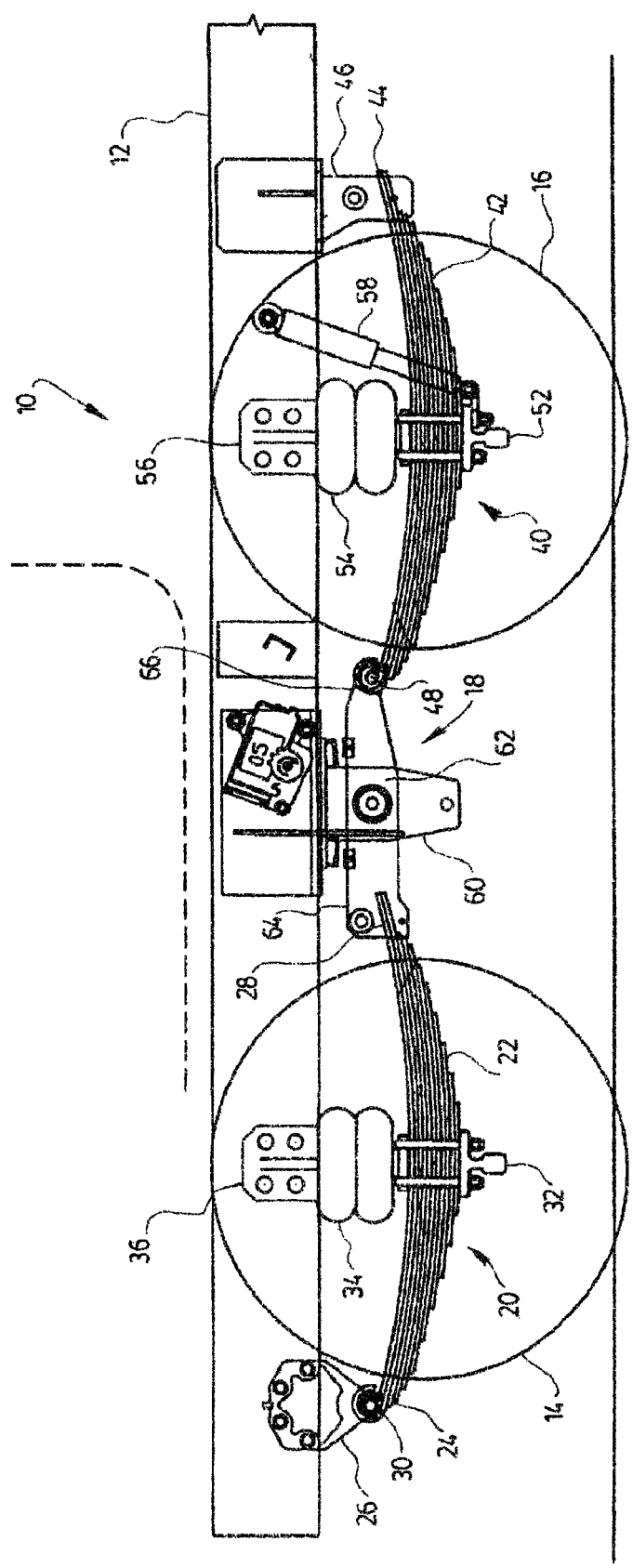
FIG. 1 is a side view of a tandem air spring suspension in accordance with an embodiment of the present invention.

Referring to FIG. 1, there is shown a front portion of a truck including a tandem air spring suspension 10 in accordance with an embodiment of the present invention. The suspension 10 connects a chassis 12 of the vehicle to the first and second front axles 32 and 52. In a preferred embodiment, the first and second front axles are steerable axles which are mounted to the chassis of a vehicle's driver compartment, or cab, rather than a vehicle trailer. For the sake of clarity, the first and second axles 32 and 52 will therefore be referred to as front axle 32 and rear axle 52 in order to indicate their relative locations in the front suspension 10. Corresponding front and rear pairs of wheels 14 and 16 (one of each pair being shown transparently) are mounted on the front and rear axles 32 and 52, respectively, of the tandem suspension 10.

The front and rear axles 32 and 52 are respectively connected to front and rear spring assemblies 20 and 40 being linked by an equalizer assembly 18 which, as is known in the art, serves to distribute the load between the front and rear spring assemblies 20 and 40. Preferably, the equalizer assembly 18 is mounted to the chassis 12 between the front and rear axles 32 and 52. The equalizer assembly 18 includes an equalizer hanger 60 which rockably mounts an equalizer arm 62 to the chassis 12. The equalizer arm 62 has front and rear ends 64 and 66 which are located on opposing sides of the pivotal connection with the equalizer hanger 60. The distances between the rockable connection and each of the front and rear ends 64 and 66, as well as other proportions of the equalizer arm 62, may be symmetric or non-symmetric. An equalizer arm 62 mounted to the equalizer hanger 60 such that the afore-mentioned distances are substantially equal may be called "centered". An equalizer arm 62 mounted to the equalizer hanger 60 such that one of the front and second ends 64 and 66 is farther from the rockable connection than the other may be called "off-center". In the preferred embodiment, the equalizer arm 62 is off-center. In such a case, the positioning of the axle along the front and rear leaf springs will usually also be off-center, and the length of the segments of the leaf springs on each side of the axle selected to properly balance the suspension as know from Canadian Patent No. 2,070,859.

The front spring assembly 20 includes a front leaf spring 22 linking the chassis 12 and the front axle 32. The front leaf spring 22 has first and second extremities 24 and 28, between which is mounted the front axle 32. The front spring 22 engages the chassis 12 at its first extremity 24 and the equalizer assembly 18 at its second extremity 28. The first extremity 24 of the front leaf spring 22 is preferably pivotally attached to the chassis 12 by a first bracket 26, for example via a pin 30 extending transversely through the first extremity 24 and the first bracket 26. The second extremity 28 of the front leaf spring 22 engages the front end 64 of the equalizer arm 62, preferably by a roller and transverse pin connection as is well known in the art. As will be apparent to a person skilled in the art, any other appropriate connection mechanism between the first extremity 24 and the chassis 12, such as a shackle or a transverse pin connection, could also be used. Similarly, it will be apparent that any other appropriate connection mechanism between the second extremity 28 and the chassis 12, such as a pivotal attachment or a shackle could also be used.

The front axle 32, to which the first pair of front wheels 14 is pivotally and steerably mounted, is attached to the front leaf spring 22 between the first and second extremities 24 and 28. The front axle 32 may be attached to the front leaf spring 22 in one of many ways known in the art, for example by bolts and U-shaped brackets. The front axle 32 can be attached near or offset the longitudinal center of the front spring 22.

A front air spring 34 is further disposed between the front axle 32 and the chassis 12. The expression "air spring" is used herein to describe any mechanical device using confined air to generate a force in response to a vehicle's suspension motion. Preferably, the front leaf spring 22 and front air spring 34 are mounted in parallel between the chassis 12 and the front axle 32. The front air spring 34 is fixed to the chassis 12 by a second bracket 36 and can be fixed to the front leaf spring 22 in line with the front axle 32, or directly to the front axle 32.

As mentioned above, the suspension 10 further includes a rear spring assembly 40 comprising a rear leaf spring 42 linking the chassis 12 and the rear axle 52. The rear leaf spring 42 has first and second extremities 44 and 48, between which is mounted the rear axle 52. The rear spring 42 engages the chassis 12 at its first extremity 44 and the equalizer assembly 18 at its second extremity 48. The first extremity 44 of the rear leaf spring 42 is preferably received in a third bracket 46 by a roller and transverse pin connection, as is well known in the art. The second extremity 48 of the rear leaf spring 42 is preferably pivotally attached to the rear end 66 of the equalizer assembly 18. As will be apparent to a person skilled in the art, any other appropriate connection mechanism between the first extremity 44 and the chassis, such as a pivotal attachment or a shackle, could alternatively be used. Similarly, it will be apparent that any other appropriate connection mechanism between the second extremity 48 and the chassis 12, such as a shackle or a transverse pin connection could also be used.

The rear axle 52, to which the second pair of front wheels 16 is pivotally and steerably mounted, is attached to the rear leaf spring 42 between the front and rear ends 44 and 48. Similar to the front axle 32, the rear axle 52 may be attached to the rear leaf spring 42 in any of the conventional ways known in the art. The rear axle 52 is also preferably attached near and slightly offset the longitudinal center of the rear leaf spring 42.

Between the rear axle 52 and the chassis 12 is further disposed a rear air spring 54. Preferably, the rear leaf spring 42 and rear air spring 54 are mounted in parallel between the chassis 12 and the rear axle 32. The rear air spring 54 is fixed to the chassis 12 by a fourth bracket 56 and can be fixed to the rear leaf spring 42 in line with the rear axle 52, or directly to the rear axle 52.

A pneumatic control system 15 (shown in FIG. 2) pneumatically links the front and rear air springs 34 and 54 and supplies a pressurized gas, such as air, thereto. The pneumatic control system 15 further allows the unloading of one of the front and rear air springs 34 and 54, as will be discussed further herein below.

Further provided is a shock absorber 58 which is mounted between the chassis 12 and one of the front and rear axles 32 and 52, as is generally known in the art. The expression "shock absorber" is used herein to designate any device used for damping vibration or oscillation of the vehicle suspension. In this case, the shock absorber 58 is operative to dampen vibration and oscillation of both the front and rear spring assemblies 20 and 40 due to the distribution affected by the equalizer assembly 18. The shock absorber 58 may alternatively be attached directly to either of the front and rear leaf springs 22 and 42 or supplemented with a second shock absorber 58 mounted to the other of the front and rear axles 32 and 52.

As disclosed in the above-mentioned Simard patent "Tandem Axle Suspension for Vehicle", an ascending motion of the front axle 32 will exert a lifting action on the front end 64 of the equalizer arm 62 and consequently a lowering action on the rear end 66 of the equalizer arm 62. This will exert a straining action on the rear spring 42, thereby transmitting a portion of the force absorbed by the front axle 32 to the rear spring assembly 40. Similarly, the pneumatic link between the front and rear air spring 34 and 54 allows the distribution of pressurized air therebetween to further equalize the front and rear axles 32 and 52. This equalisation improves both a truck's capacity for static or near-static loading, for example when at rest or while driving along a even road surface, as well as its ability to handle dynamic loading, such when the front wheel engages a bump in the road surface and the resultant force is distributed between the front and rear axle assemblies of the tandem suspension 10. Proper equalisation is particularly important in the context of steerable axles, which are subject to such adverse dynamic affects and bump and roll steer. In addition, the steering system (not shown) typically includes mechanical components which are attached to each axle, such as a kingpin, tie rods and steering arms. Damage to these components can occur should the front and rear axles move in different directions.

It will be readily appreciable to a person skilled in the art, however, that the proportions of the equalizer arm 62 in the illustrated embodiment are reversed with respect to the embodiment disclosed in the Simard patent due to the use of rollers to engage the second extremity 28 of the front leaf spring 22 and front end 64 of the equalizer arm 62, instead of shackles. It will be further be apparent that an equalizer arm 62 having proportions akin to those of the Simard patent, or indeed having proportions which differ in another way therefrom, are also within the scope of the present invention.

As will be readily appreciable by one of ordinary skill in the art, an equivalent construction is present on the opposite side of the truck similarly supporting front and rear axles 32 and 52 and equalizing the load therebetween. This equivalent construction is substantially a mirror-image of that illustrated in FIG. 1 and will not be discussed further herein.

Moreover, as illustrated in FIG. 1, the first and second extremities 24 and 28 of the front leaf spring 22 are preferably located in front of and behind the front axle 32, respectively, while the first and second extremities 44 and 48 of the second leaf spring are preferably located behind and in front of the rear axle 52, respectively. However, as will be appreciated by person skilled in the art, other embodiments and orientations are within the scope of the present invention. More specifically, it will be appreciated that an embodiment wherein the second extremity 48, and hence the connection with the rear end 66 of the equalizer arm 62, is located behind the rear axle 52 is within the scope of the present invention.

Figure 2:
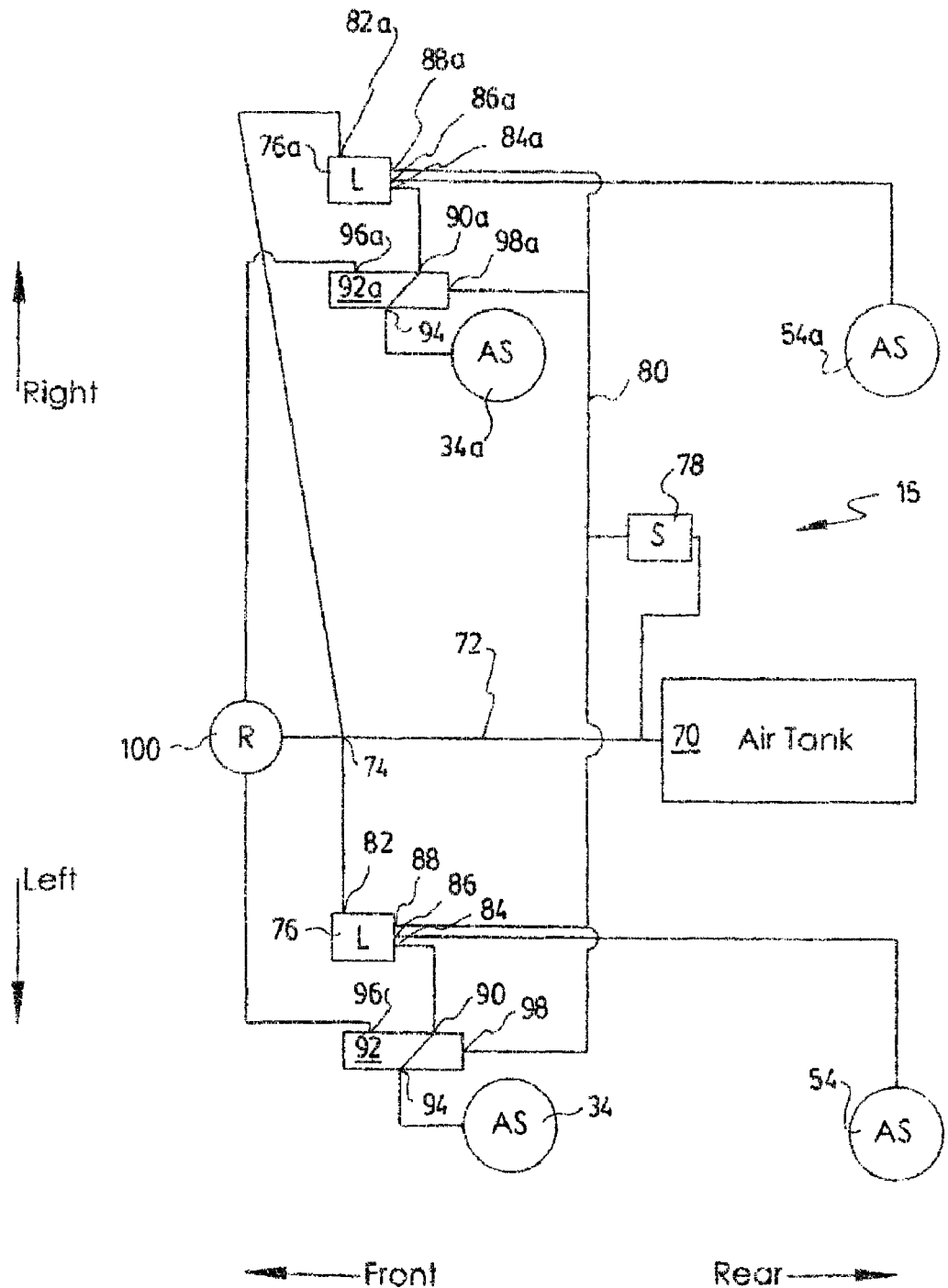
FIG. 2 is a schematic representation of a pneumatic circuit in accordance with the air spring suspension of FIG. 1.

FIG. 2 shows a symbolic representation of the pneumatic control system 15 according to a preferred embodiment of the invention, which supplies the air springs 34 and 54 (left side), and the equivalent air springs 34a and 54a (right side) from an air reservoir 70, such as an air tank. On each side, the pneumatic control system 15 includes a pneumatic level valve 76 and 76a for receiving the pressurized gas from the tank 70 and distributing it to the left- and right-side front and rear air springs 34, 54, 34a and 54a. Each level valve 76 and 76a pneumatically links respective front and rear air springs 34 and 54, 34a and 54a, such that the air pressures therein can be balanced.

Due to the symmetry involved, and for the sake of simplicity, throughout the remainder of the present description any and all discussion concerning elements of the left side applies equally to corresponding elements of the right side denoted with the suffix "a". For example, the level valve 76 on the "left" side of the vehicle as indicated in FIG. 2 corresponds with the level valve 76a on the "right" side.

Preferably, the level valve 76 monitors the distance between the rear axle 52 and the chassis 12. This monitoring is used by the pneumatic system 15 to adjust the pressure in the air springs 34 and 54 accordingly. If the chassis 12 is determined to be too close to the rear axle 52, then additional air pressure is supplied. Conversely, if they are deemed too far apart, the air pressure is reduced. As will be apparent to person skilled in the art, the level valve 76 could similarly monitor the front axle 32. It will further be apparent that other means of monitoring this distance, such as electronic monitoring devices, are within the scope of the present invention.

The tank 70 supplies pressurized air to the air springs 34 and 54 via a primary conduit 72, through a four-way junction 74, and the level valve 76. A switch 78 is operable by the user and controls the flow of pressurized air through a secondary conduit 80. In normal operation, the switch 78 is closed and does not convey pressurized air from the tank 70 through the secondary conduit 80, as will be discussed in detail below.

The level valve 76 includes an input 82 in fluid communication with the primary conduit. The level valve 76 further includes first and second outputs 84 and 86 which supply the front and rear air springs 34 and 54, respectively. The first and second output 84 and 86 are pneumatically linked so as to ensure an equal pressure and even load distribution therebetween at all times. The level valve 76 further includes an exhaust control signal input 88 which is in fluid communication with the secondary conduit 80.

The pneumatic control system 15 further preferably includes a pneumatic three-way valve 92. The three-way valve 92 has a first input 90 in fluid communication with the level valve 76 for receiving pressurised gas therefrom, an output 94 in fluid communication with the front air spring 34 for supplying pressurised gas thereto, and a second input 96 in fluid communication with the tank 70 for receiving pressurised gas which has bypassed the level valve 76. The three-way valve 92 is operable in either a first mode of operation wherein the first input 90 and the output 94 are connected, or a second mode of operation wherein the second input 96 and the output 94 are connected, as will be discussed in further detail below.

In the first mode of operation, pressurized air from the first output 84 of the level valve 76 enters the first input 90 of the three-way valve 92 and exits the output 94 to reach the first air spring 34. The three-way valve 92 also has a control signal input 98, which, along with the second input 96, is inoperative during "normal" operation.

In "normal" vehicle operation, the switch 78 is closed and the three-way valve 92 is in its first mode of operation. Pressure is supplied from the air tank 70 through the primary conduit 72 to the four-way junction 74 and evenly distributed amongst the air springs 34 and 54 by the level valve 76 so as to pneumatically level the suspension 10. This leveling is regulated, preferably and as noted earlier, by monitoring the distance between the front axle 32 and the chassis 12, although other alternative methods of leveling are possible.

In addition to advantageously increasing ride comfort, the suspension 10 additionally enables the vehicle to operate in an "off-road" setting, herein considered to be operation of the vehicle on any non-public roadway. In such a situation, it may be advantageous to have only one of the front tandem axles bearing a load, in order to increase load on the truck's rear driven axle(s) and therefore increase traction on difficult terrain.

To put the suspension 10 in the "off-road" setting, the switch 78 is opened, thereby supplying pressurized air to the secondary conduit 80. The pressurized air in the secondary conduit 80 functions as a control signal sent to the level valve 76 at the exhaust control signal input 88, and to the three-way valve 92 at the control signal input 98. Receipt of this control signal by the level valve 76 causes it to exhaust the outputs 84 and 86, preferably by opening them to the atmosphere. Receipt of the control signal by the three-way valve 92 causes it to switch to its second mode of operation, closing the first input 90 and connecting the second input 96 and the output 94.

In the preferred embodiment, the control signal sent by the switch 78 is an increase in air pressure. However, it will be readily appreciated by person skilled in the art that a control signal sent in another form, for example a decrease in air pressure, an electrical signal, or other mechanical engagement are within the scope of the invention.

When the output 86 of the level valve 76 is exhausted, the air spring 54 becomes depressurized, thereby unloading the rear axle 52. In conjunction with the exhausting of the output 84, the first input 90 of the three-way valve 92 is closed and the second input 96 is opened. Pressurized air from the tank 70 is thereby able to be supplied via the primary conduit 72, through the four-way junction 74 to a regulator 100. The pressurized air supplied by the regulator 100 bypasses the level valve 76 and pressurizes the air spring 34 via the second input 96 to a pre-determined amount. In this manner, only the first air spring 34 is pressurized and the suspension is enabled for single axle off-road capability.

It will be readily understood that the tandem air spring suspension 10 may be installed at any point during the life of a vehicle. The suspension 10 may be installed during vehicle fabrication, or indeed may be provided as an "after-market" addition wherein the front and rear air springs 34 and 54, and some or all of the pneumatic components illustrated in FIG. 2 are not factory-installed but rather added later by skilled technicians.

In a preferred embodiment, a single axle vehicle may be modified into a tandem axle vehicle with the presently described air spring suspension 10 by modifying the single axle system to become a tandem air spring suspension 10. Specifically, a vehicle having a first steerable axle 32 mounted to a chassis 12 by a first leaf spring 22 may be fitted with a tandem suspension 10 by providing a second steerable axle 52 in tandem with the first axle 32, linking the chassis and the second axle with a second leaf spring 42, installing an equalizer assembly 18 for equalizing the first and second axles 32 and 52, installing first and second air springs between the first and second axles, respectively, and installing a pneumatic control system for supplying pressurized gas thereto.

A vehicle having a pneumatically actuated braking system will already include a pneumatic system having an air tank and associated components for compressing and storing pressurized air. However, the capacity of this pneumatic system may not be sufficient to handle pressurization of the subsequently installed air springs, or the increased load capacity of the vehicle. As such, the components of the existing pneumatic system may need to be replaced or modified accordingly. In addition, the existing front leaf spring may need to be modified in order to either raise or lower its capacity, or indeed may be replaced altogether with a spring having a higher or lower rating.

As being now better appreciated, the present invention is an improvement and presents several advantages over other related devices and/or methods known in the prior art. Indeed, the present invention is particularly advantageous in its specific combination of equalized leaf springs and air springs which increases ride comfort, which is not only beneficial to the vehicle's driver and any cargo contained therein, but also extends the lifetime of the vehicle as well.

In addition to providing the comfort of an air spring suspension and the load capacity of a tandem suspension, the present invention conveniently and advantageously provides the ability to unload the second front axle, providing increased traction to the driven wheels for off-road operation.

Of course, numerous modifications could be made to the above-described embodiments without departing from the scope of the invention, as apparent to a person skilled in the art. While a specific embodiment of the present invention has been described and illustrated, it will be apparent to those skilled in the art that numerous modifications and variations can be made without departing from the scope of the invention as defined in the appended claims.

The invention claimed is:

1. A tandem suspension for connecting a chassis of a vehicle to front and rear axles, the front and rear axles being steerable, the tandem suspension comprising, on each side of the vehicle:
   a front leaf spring linking the chassis and the front axle, the front leaf spring having first and second extremities and the front axle being mounted therebetween, the first extremity of the front leaf spring engaging the chassis;
   a rear leaf spring linking the chassis and the rear axle, the rear leaf spring having first and second extremities and the rear axle being mounted therebetween, the first extremity of the rear leaf spring engaging the chassis;
   an equalizer assembly mounted to the chassis for equalizing the front and rear axles, the equalizer assembly linking the respective second extremities of the front and rear leaf springs;
   a front air spring disposed between the chassis and the front axle;
   a rear air spring disposed between the chassis and the rear axle;
   a pneumatic control system pneumatically linked to the front and rear air springs for supplying pressurized gas thereto and operable to selectively unload one of the front and rear air springs such that the one of the front and rear air springs does not take the load of the vehicle, the pneumatic control system comprising:
   a) a pneumatic distributing device for receiving the pressurized gas from a reservoir and distributing it to the front and rear air springs; and
   b) a three-way valve comprising:
      an output in fluid communication with the one of the front and rear air springs for supplying pressurized gas thereto;
      a first input in fluid communication with the distributing device for receiving pressurized gas therefrom; and
      a second input in fluid communication with the reservoir for receiving pressurized gas which has bypassed the distributing device;
      the three-way valve being operable in either a first mode of operation wherein the first input and the output are connected, or a second mode of operation wherein the second input and the output are connected; and
   a switch for sending a control signal to the pneumatic control system in response to an action by an operator, the pneumatic control system being responsive to the sending of the control signal by selecting the second mode of operation of the three-way valve and thereby selectively unloading the one of the front and rear air springs.

2. The tandem suspension of claim 1, wherein the equalizer assembly comprises an equalizer hanger and an equalizer arm rockably mounted thereto.

3. The tandem suspension of claim 2, wherein the equalizer arm comprises front and rear ends, the front end engaging the second extremity of the front leaf spring and the rear end engaging the second extremity of the rear leaf spring.

4. The tandem suspension of claim 3, wherein the equalizer hanger is mounted to the chassis between the front and rear axles.

5. The tandem suspension of claim 4, wherein the rockable mounting of the equalizer arm to the equalizer hanger is off-center.

6. The tandem suspension of claim 5, wherein the first extremity of the front leaf spring is pivotally attached to the chassis.

7. The tandem suspension of claim 6, wherein the second extremity of the rear leaf spring is pivotally attached to the rear end of the equalizer arm.

8. The tandem suspension of claim 7, wherein the first extremity of the rear leaf engages the chassis via a roller and transverse pin connection.

9. The tandem suspension of claim 8, wherein the second extremity of the front leaf spring engages front end of the equalizer arm via a roller and transverse pin connection.

10. The tandem suspension of claim 1, wherein the front and rear leaf springs are mounted in parallel with the front and rear air springs, respectively, between the chassis and the front and rear axles, respectively.

11. The tandem suspension of claim 1, further comprising a shock absorber mounted between the chassis and one of the front and rear axles.

12. The tandem suspension of claim 1, wherein the distributing device pneumatically balances the front and rear air springs.

13. The tandem suspension of claim 1, wherein the distributing device is further operable to exhaust the one of the front and rear air springs when the three-way valve is in the second mode of operation.

14. A method of installing a tandem suspension in a vehicle having a first steerable axle and a first leaf spring linking the chassis and the first axle, the first leaf spring having first and second extremities, the first extremity engaging the chassis, the method comprising steps of:
   providing a second steerable axle for positioning behind the first axle in a tandem configuration therewith;
   linking the chassis and the second axle with a second leaf spring, the second leaf spring having first and second extremities, the first extremity for engaging the chassis, the second axle being mounted between the first and second extremities;
   installing an equalizer assembly for equalizing the front and rear axles, the equalizer assembly operable to be mounted to the chassis and to link the respective second extremities of the front and rear leaf springs;
   installing a front air spring between the chassis and the first axle;
   installing a rear air spring between the chassis and the second axle;
   installing a pneumatic control system operable to be pneumatically linked to the front and rear air springs for supplying pressurized gas thereto and operable to selectively unload one of the front and rear air springs such that the one of the front and rear air springs does not take the load of the vehicle, the pneumatic control system comprising:
  a) a pneumatic distributing device for receiving the pressurized gas from a reservoir and distributing it to the front and rear air springs; and
  b) a three-way valve comprising:
    an output in fluid communication with the one of the front and rear air springs for supplying pressurized gas thereto;
    a first input in fluid communication with the distributing device for receiving pressurized gas therefrom; and
    a second input in fluid communication with the reservoir for receiving pressurized gas which has bypassed the distributing device;
    the three-way valve being operable in either a first mode of operation wherein the first input and the output are connected, or a second mode of operation wherein the second input and the output are connected; and
  installing a switch for sending a control signal to the pneumatic control system in response to an action by an operator, the pneumatic control system being responsive to the sending of the control signal by selecting the second mode of operation of the three-way valve and thereby selectively unloading the one of the front and rear air springs.

15. The method of claim 14, further comprising the step of modifying the capacity of the front leaf spring.

16. A tandem suspension for connecting a chassis of a vehicle to front and rear axles, the front and rear axles being steerable, the tandem suspension comprising, on each side of the vehicle:
  a front air spring disposed between the chassis and the front axle;
  a rear air spring disposed between the chassis and the rear axle;
  a pneumatic control system pneumatically linked to the front and rear air springs for supplying pressurized gas thereto and operable to pneumatically balance the front and rear air springs, the pneumatic control system being further operable to selectively unload one of the front and rear air springs such that the one of the front and rear air springs does not take the load of the vehicle, the pneumatic control system comprising:
  a) a pneumatic distributing device for receiving the pressurized gas from a reservoir and distributing it to the front and rear air springs; and
  b) a three-way valve comprising:
    an output in fluid communication with the one of the front and rear air springs for supplying pressurized gas thereto;
    a first input in fluid communication with the distributing device for receiving pressurized gas therefrom; and
    a second input in fluid communication with the reservoir for receiving pressurized gas which has bypassed the distributing device;
    the three-way valve being operable in either a first mode of operation wherein the first input and the output are connected, or a second mode of operation wherein the second input and the output are connected; and
  a switch for sending a control signal to the pneumatic control system in response to an action by an operator, the pneumatic control system being responsive to the sending of the control signal by selecting the second mode of operation of the three-way valve and thereby selectively unloading the one of the front and rear air springs.

17. The tandem suspension of claim 16, wherein the distributing device pneumatically balances the front and rear air springs.

18. The tandem suspension of claim 16, wherein the distributing device is further operable to exhaust the one of the front and rear air springs when the three-way valve is in the second mode of operation.

19. The tandem suspension of claim 1, wherein the distributing device is a level valve.

20. The tandem suspension of claim 16, wherein the distributing device is a level valve.

* * * * *